United States Patent [19]

Sherman

[11] Patent Number: 4,905,407
[45] Date of Patent: Mar. 6, 1990

[54] BAFFLED RODENTICIDE BOX

[76] Inventor: Daniel A. Sherman, 1355 Boblink Pl., Los Angeles, Calif. 90069

[21] Appl. No.: 354,103

[22] Filed: May 22, 1989

[51] Int. Cl.$^4$ .......................................... A01M 25/00
[52] U.S. Cl. ..................................................... 43/131
[58] Field of Search .......................................... 43/131

[56] References Cited

U.S. PATENT DOCUMENTS

| | | | |
|---|---|---|---|
| 1,352,067 | 9/1920 | Keyser | 43/131 |
| 3,094,805 | 6/1963 | Luck | 43/131 |
| 3,177,610 | 4/1965 | Smith | 43/131 |
| 4,453,337 | 6/1984 | Williams | 43/131 |
| 4,550,525 | 11/1985 | Baker | 43/131 |
| 4,570,377 | 2/1986 | Primavera | 43/131 |
| 4,611,426 | 9/1986 | Willis | 43/131 |
| 4,619,071 | 10/1986 | Willis | 43/131 |
| 4,658,536 | 4/1987 | Baker | 43/131 |
| 4,730,412 | 3/1988 | Sherman | 43/131 |

*Primary Examiner*—Kurt Rowan

[57] ABSTRACT

This invention relates to the packaging of a rodenticide product for consumer use in a manner the will inhibit the spillage of rodenticide when the user opens the package for presentation of the rodenticide to the target species such as house mice or rats. Inherent in the art is the teaching of a method of presentation that is not only user friendly, but one that provides the rodent with an environment that is conducive to its natural patterns of eating and concealment.

The instant invention provides a safer method of offering a poisoned bait to a rodent population while also insuring that the palatability of the bait will be enhanced by providing the rodent with a secure habitat for its consumption of the poisoned product, thereby increasing the overall effectiveness of the baiting program.

2 Claims, 1 Drawing Sheet

U.S. Patent     Mar. 6, 1990     4,905,407
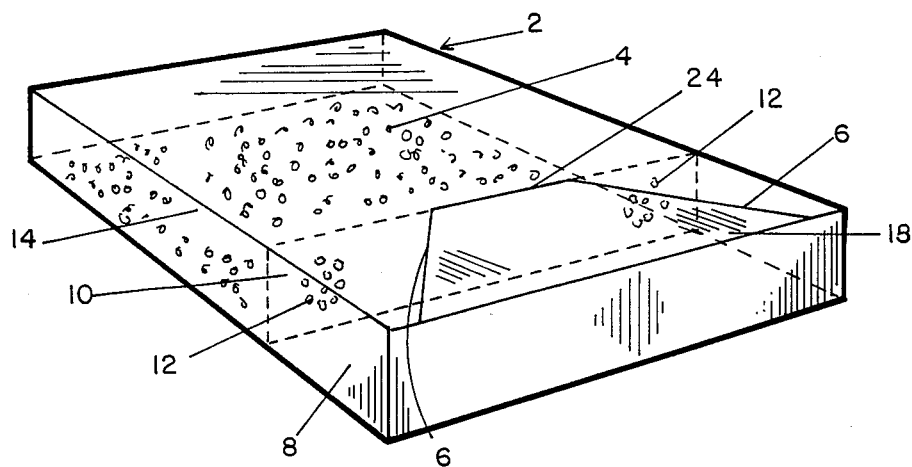
FIG. 1
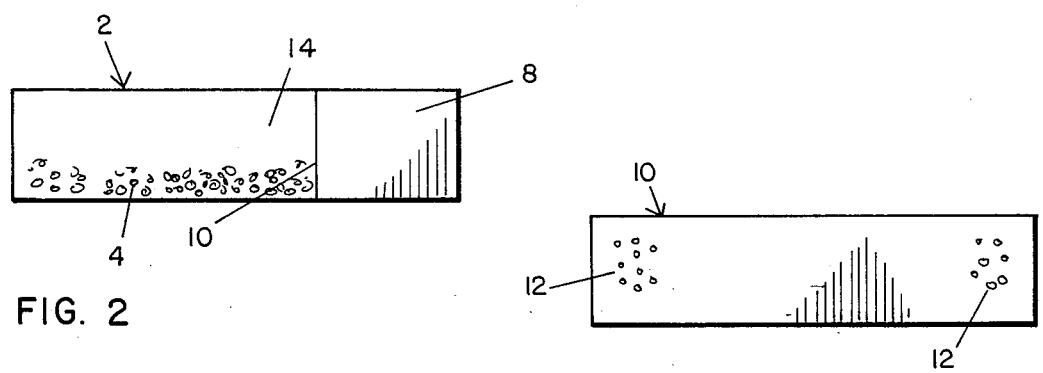
FIG. 2
FIG. 3
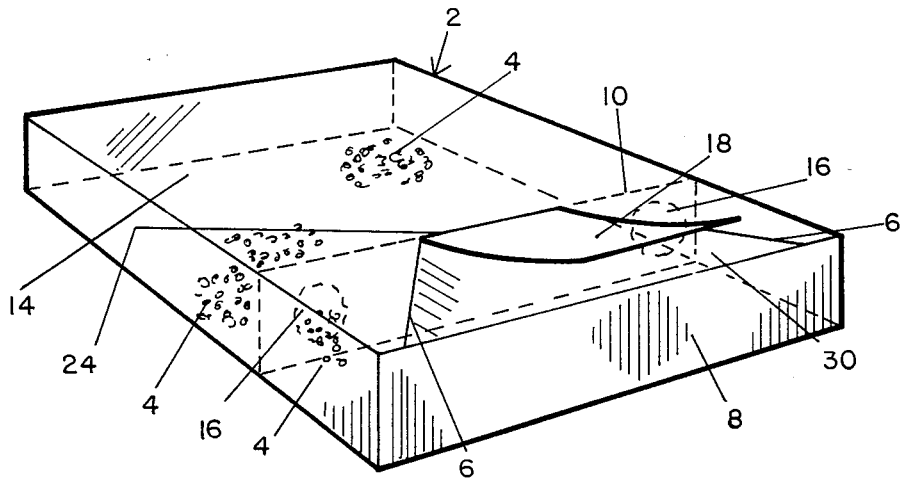
FIG. 4

1

BAFFLED RODENTICIDE BOX

BACKGROUND OF THE INVENTION

The packaging of rodenticide products in a manner that allows the average consumer to utilize these products safely has become a subject of paramount importance.

The use of poisoned baits is one of the most popular forms of eradicating these pest that compete with man for food and shelter.

However, the same poisoned substances that can kill a target rodent also offer the possibility of injuring non target animals, humans, and contaminating food and human habitats.

This is especially true when these powerful toxins are used by consumers who purchase the product over-the-counter and may lack the rudimentary skills needed to properly deploy and utilize the products.

A need to offer these average consumers a method of deployment and a method of setting the poison up in a safe manner becomes a matter of significant importance.

Since most bait is currently sold pre-packaged in boxes that require that the user tear open the top of the box in order to expose the poisoned material, the probability of spilling the bait before actual placement is significant.

Over the past few years a number of methods have been developed that afford a "tamper-resistant" method of rodenticide deployment and these have taken the form of various patented devices such as; Young, 1,325,069 12/1919, class 43/131, Sherman 4,349,982, 9/1982, class 43/131, Willis 4,611,426 9/1986, class 43/131, Sherman 4,730,412, 3/1988, class 43/131 and foreign patents 1517930, France 6/1983, class 43/131.

All fo these devices depended upon the user introducing a poisoned bait into another containments device, and thereby having the possibility of spilling the bait or contaminating surfaces in the process of loading bait in the separate containers.

Few methods have been developed for utilizing the actual shelf pack that the poisoned bait has been sold in a manner the would inhibit the spillage and/or contact with the bait at the time the consumer opens the package for deployment.

The instant invention concerns itself with just this element of use in that it provides a safe and effective method of handling a poisoned substance in a manner that will greatly reduce the risk of exposure to the user.

By segregating the bait from the opening segment of the container, the instant invention provides isolation of the toxic substance at the time it is most vulnerable to misuse and accidental spillage.

Additionally, the instant invention provides a method of directing the target rodent to a position within the package that will insure the minimum exposure of the bait to outside surfaces, even when the rodent has compromised the package by knawing through the interior protective wall.

And, the instant invention allow the user to open the box in a manner the does not require any degree of skill, while insuring that the poison is isolated prior to the rodent attacking it.

Further, the invention allows the deployment of the bait while still in the carton when the carton is dropped vertically behind small, tight places such as washers that rodents like to traverse and hide in.

These features, and the teachings contained within the description and accompanying art, will show the packager and user of poisoned bait a method of isolating these toxic substance in a mass produced product that can easily and effectively be used by the most unskilled consumer.

BRIEF DESCRIPTION OF THE DRAWINGS

FIG. 1 demonstrates the overall construction of the bait box containing two compartments divided by a protective wall. Seen is the bait containment compartment that is sealed from the access compartment. In this depiction the carton is sealed and a perforated flap is noted on the top. Said perforations are seen to offer the opportunity for the top of the carton to be opened from the leading front edge, along two sides, and stopping just short of exposing the bait that has been placed behind the interior wall of the carton.

In FIG. 2 we see a side view of the cartons interior showing the relationships between the compartment containing the poisoned bait product and the access compartment. Depicted is the protective wall separating the two compartments within the carton.

FIG. 3 shows the detail of the protective dividing wall and demonstrates the fabrication of the wall which has been constructed to allow a biting edge to be available for a rodent to knaw on.

In FIG. 4 we see the carton in an open position with the access compartment available for a rodent to crawl into and to knaw the biting edges formed in the protective wall between the two compartments. Seen in this depiction is the expanded hole that a rodent will either enter into the second bait compartment through, or bait from the compartment having been pulled by the rodent into the access compartment. The top has been pulled back to provide a protective flap that offers a partially closed and shielded area for the rodent to feed in.

DETAILED DESCRIPTION OF THE DRAWINGS

FIG. 1 show the carton generally as 2 with the interior having been divided into two separate compartments, one 14 containing rodent bait 4 and the other 8 being an empty accessway. The two compartments are divided by a protective wall 10 that isolates the bait 4 from entering the access portion 8 of the carton. The carton 2 has on its top a perforated panel 18 that can be torn back along lines 6 and folded along line 24 to expose the access compartment 8. The protective wall 10 has a series of holes or ridges 12 that provide or get to the poisoned bait 4. These holes 12 are positioned in such a manner as to guide the rodent into the position best suited for maintaining the bait in the carton 2 when the wall has been breached.

FIG. 2 is a side view of the carton 2 showing the relationships between the access compartment 8, the protective wall 10 and the bait containment compartment 14. The poisoned bait is noted in this depiction as 4.

FIG. 3 is a detail of the protective wall 10 showing the possible positioning of the biting edge holes or ridges depicted as 12. These holes are constructed to be smaller than the bait 4 contained within the bait containment compartment and can be positioned at any point along the protective wall 10 to guide the rodent into eating at a point that offers the maximum security for the poisoned bait. By providing at least two set of biting holes of ridges 12 at opposing ends of the protective wall 10 we encourage two or more rodent to enter and feed without competing for the same food.

FIG. 4 shows the carton 2 in the open configuration ready for a rodent to enter and feed. The flap 18 has been pulled back along lines 6 and folded along line 24 to provide a entrance to the first compartment 8 a to form a trough 30 with access to the protective wall 10. In this figure the rodents have eaten their way through the holes 12 and have left a larger breach 16 that allows them to freely feed off the poisoned bait 4 contained within the compartment 14. The flab 18 when raised to an upright position as in FIG. 4 provides a partial shield for a rodent and adds to its comfort level when feeding within the box.

What I claim is:

1. A package for the containment and sale of a rodenticide bait product; said package having been divided into a plurality of compartments; one or more of said compartments containing a poisoned bait; said compartments having been isolated from a access compartment by a protective wall positioned intermediate to the exterior walls of said package said access compartment having a perforated panel which is opened by a user to expose said protective wall; said protective wall having holes of a smaller size that the size of the individual pieces of said poisoned bait; said holes being positioned in such a manner that they direct and lure the rodent to a position within the package that will prevent bait spillage to the outside of said package when the target rodent has breached said protective wall.

2. A package for the containment and sale of a rodenticide product product as in claim 1; said package constructed with in interior protective wall as in claim 1; said wall having been pierced by small holes that provides a initial biting edge that allows a target rodent to knaw through the protective wall with a minimum of effort.

* * * * *